United States Patent
Yeh

(10) Patent No.: US 7,628,664 B2
(45) Date of Patent: Dec. 8, 2009

(54) SLIDER WITH FOAM RAILS

(76) Inventor: Tzong In Yeh, 4566 Crestwood St., Fremont, CA (US) 94538

( * ) Notice: Subject to any disclaimer, the term of this patent is extended or adjusted under 35 U.S.C. 154(b) by 1155 days.

(21) Appl. No.: 11/103,873

(22) Filed: Apr. 12, 2005

(65) Prior Publication Data

US 2005/0188637 A1     Sep. 1, 2005

Related U.S. Application Data

(63) Continuation-in-part of application No. 10/797,094, filed on Mar. 11, 2004, now Pat. No. 6,988,920, and a continuation-in-part of application No. 10/386,634, filed on Mar. 13, 2003, now Pat. No. 6,955,576.

(30) Foreign Application Priority Data

Apr. 14, 2004    (TW)  ............................... 93205743 U

(51) Int. Cl.
     *B63B 1/00*      (2006.01)
(52) U.S. Cl. .......................................... 441/65; 441/74
(58) Field of Classification Search ................... 441/65, 441/70, 74
See application file for complete search history.

(56) References Cited

U.S. PATENT DOCUMENTS

| | | | | |
|---|---|---|---|---|
| 3,145,400 A | * | 8/1964 | Yoakum | 441/65 |
| 3,512,195 A | * | 5/1970 | Porsche et al. | 441/65 |
| 3,561,025 A | * | 2/1971 | Teach | 441/65 |
| 3,952,354 A | * | 4/1976 | Turner | 441/65 |
| 4,561,664 A | * | 12/1985 | Cashmere | 441/65 |
| 4,850,913 A | * | 7/1989 | Szabad, Jr. | 441/65 |
| 4,878,980 A | * | 11/1989 | Stedman | 441/65 |
| 5,211,593 A | * | 5/1993 | Schneider et al. | 441/65 |
| 5,647,784 A | * | 7/1997 | Moran | 441/65 |
| 5,658,179 A | * | 8/1997 | Glydon et al. | 441/74 |

\* cited by examiner

*Primary Examiner*—Lars A Olson
(74) *Attorney, Agent, or Firm*—Rosenberg, Klein & Lee

(57) ABSTRACT

A slider includes a foam board, a top layer and a bottom layer. The foam board is a polystyrene foam board that is easily formed and molded. Furthermore, a bottom of the foam board has a rail portion protruded with a plurality of foam rails therefrom and the foam rails are parallel with each other. In addition, the top layer and the bottom layer are made of polyethylene materials and comprise interface coatings respectively, so that the top layer and the bottom layer made of polyethylene could heat bonded to the polystyrene foam board without adhesives by the first and second interface coatings.

10 Claims, 15 Drawing Sheets

SLIDER WITH FOAM RAILS

CROSS REFERENCE TO RELATED APPLICATION

This application is a continuation-in-part application of U.S. application Ser. No. 10/797,094, filed Mar. 11, 2004, now U.S. Pat. No. 6,988,920 and also is a continuation-in-part application of U.S. application Ser. No. 10/386,634 filed, Mar. 13, 2003 now U.S. Pat. No. 6,955,576.

BACKGROUND OF THE INVENTION

1. Field of the Invention

The present invention relates to a slider, and more particularly to a slider that can function as a surfboard, a bodyboard, a floating board, a skiing board, a sliding board or the like.

2. Description of the Related Art

A conventional slider comprises a main body made of a polyethylene foam material, and a plurality of handgrips mounted on a periphery of the main body to facilitate a user holding the slider. However, the main body made of a polyethylene foam material reflects greater costs in material and trimming.

For reducing the cost, another conventional slider comprises a main body made of a polystyrene foam material, which reflects reduced costs in material and trimming because the polystyrene foam material is easily to be molded into particular shapes. However, the main body made of polystyrene foam material is easily worn out and broken; therefore, a wearable plastic plate attached on the bottom of the main body is necessary for strengthening the durability of the slider. In addition, the main body made of a polystyrene foam material is difficult and incompatible bonded to the plastic plate without adhesives. Therefore, the slider made of polystyrene foam material and having a strong structure is in great demand.

SUMMARY OF THE INVENTION

The primary objective of the present invention is to provide a slider having a predetermined shape of a foam board that is easily molded.

Another objective of the present invention is to provide a slider, wherein the foam board is integrally formed of a polystyrene foam material, so that the shape of the foam board is formed easily and conveniently, thereby saving the manufacturing time and decreasing costs of fabrication.

A further objective of the present invention is to provide a slider, wherein a top layer and a bottom layer are respectively heat bonded to a top face, a bottom face and edges of the foam board of the slider by interface coatings, which have characteristics for heat bonding the polystyrene foam board to polyethylene materials without adhesives, such as polyethylene foam skins and polyethylene plates/films. Therefore, the bottom layer, such as a plastic laminate composed of a polyethylene foam skin and a plate, could be heat bonded to the bottom face of the foam board, and the top layer, such as a plastic laminate composed of a polyethylene foam skin and films, could be heat bonded to the top face and the edges of the foam board without adhesives.

More particularly, the top face of the foam board has a riding portion and the bottom face of the foam board has a rail portion opposite to the riding portion. The rail portion of the bottom face of the foam board has a plurality of foam rails internally protruded therefrom and the foam rails are parallel with each other.

In addition, the top layer of the slider comprises an interface coating, a polyethylene foam skin, and a laminated film. The interface coating of the top layer has a bottom face heat bonded to the top face and the edges of the foam board. The polyethylene foam skin of the top layer has a bottom face heat bonded to a top face of the interface coating of the top layer, and the laminated film of the top layer is heat bonded to a top face of the polyethylene foam skin of the top layer completely. Preferably, the laminated film of the top layer is a colored/patterned film.

The bottom layer of the slider comprises an interface coating and a plastic plate. The interface coating of the bottom layer has a top face heat bonded to the bottom face of the foam board and the plastic plate of the bottom layer is heat bonded to a bottom face of the interface coating of the bottom layer completely, whereby the bottom face of the foam board and the foam rails of the rail portion of the bottom face of the foam board are covered by the bottom layer. Accordingly, the bottom layer has a plurality of recessed joints respectively by heat bonding to the foam rails of the rail portion of the bottom face of the foam board. Therefore, the foam rails of the slider are provided for guiding a sliding direction to a user.

Because the polystyrene foam material could be easily molded into varied shapes, the costs and the time are saved during manufacturing.

Further benefits and advantages of the present invention will become apparent after a careful reading of the detailed description with appropriate reference to the accompanying drawings.

DETAILED DESCRIPTION OF THE INVENTION

Figure 1:
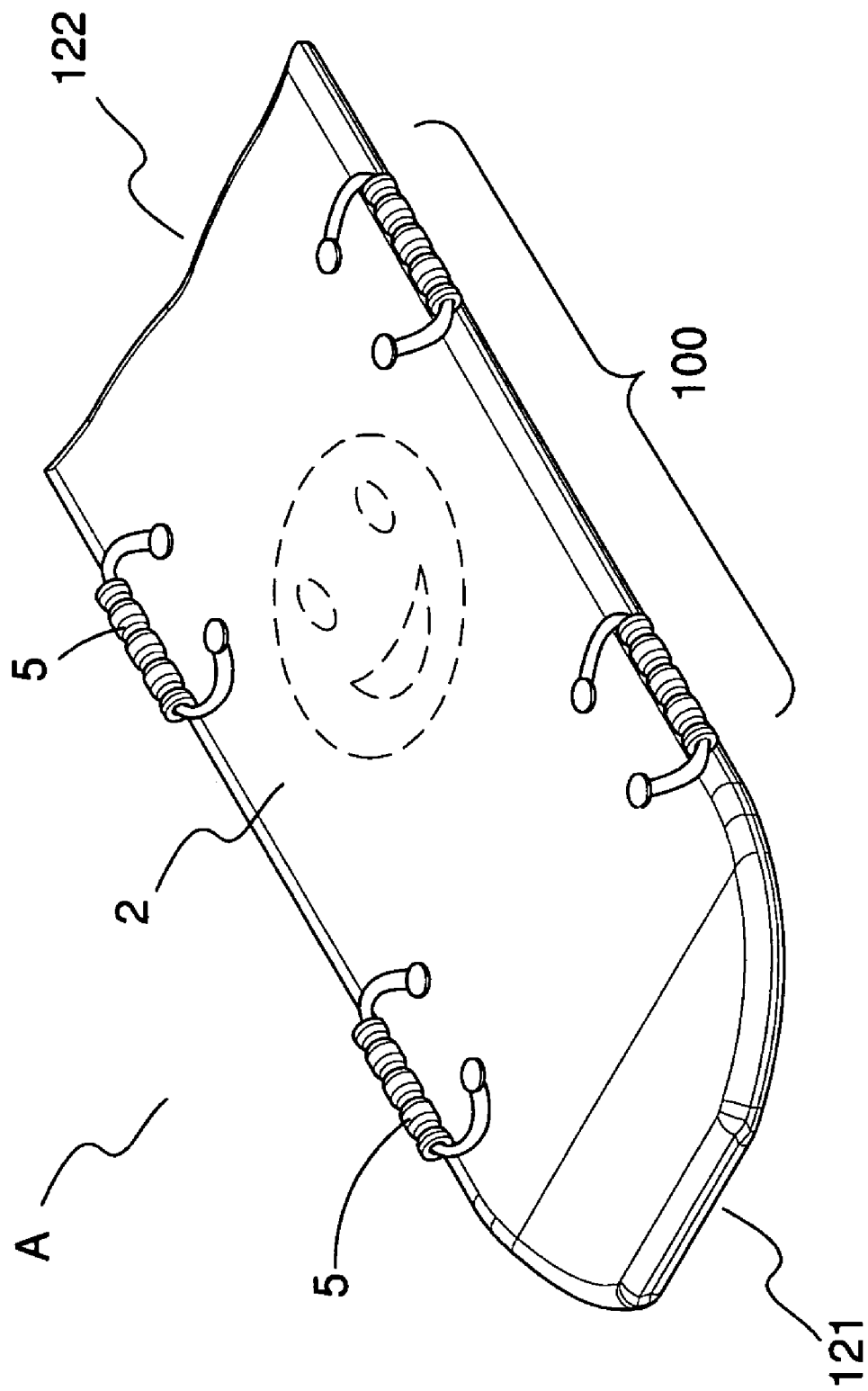
FIG. 1 is a perspective view of a slider in accordance with a first embodiment of the present invention.
Figure 2:
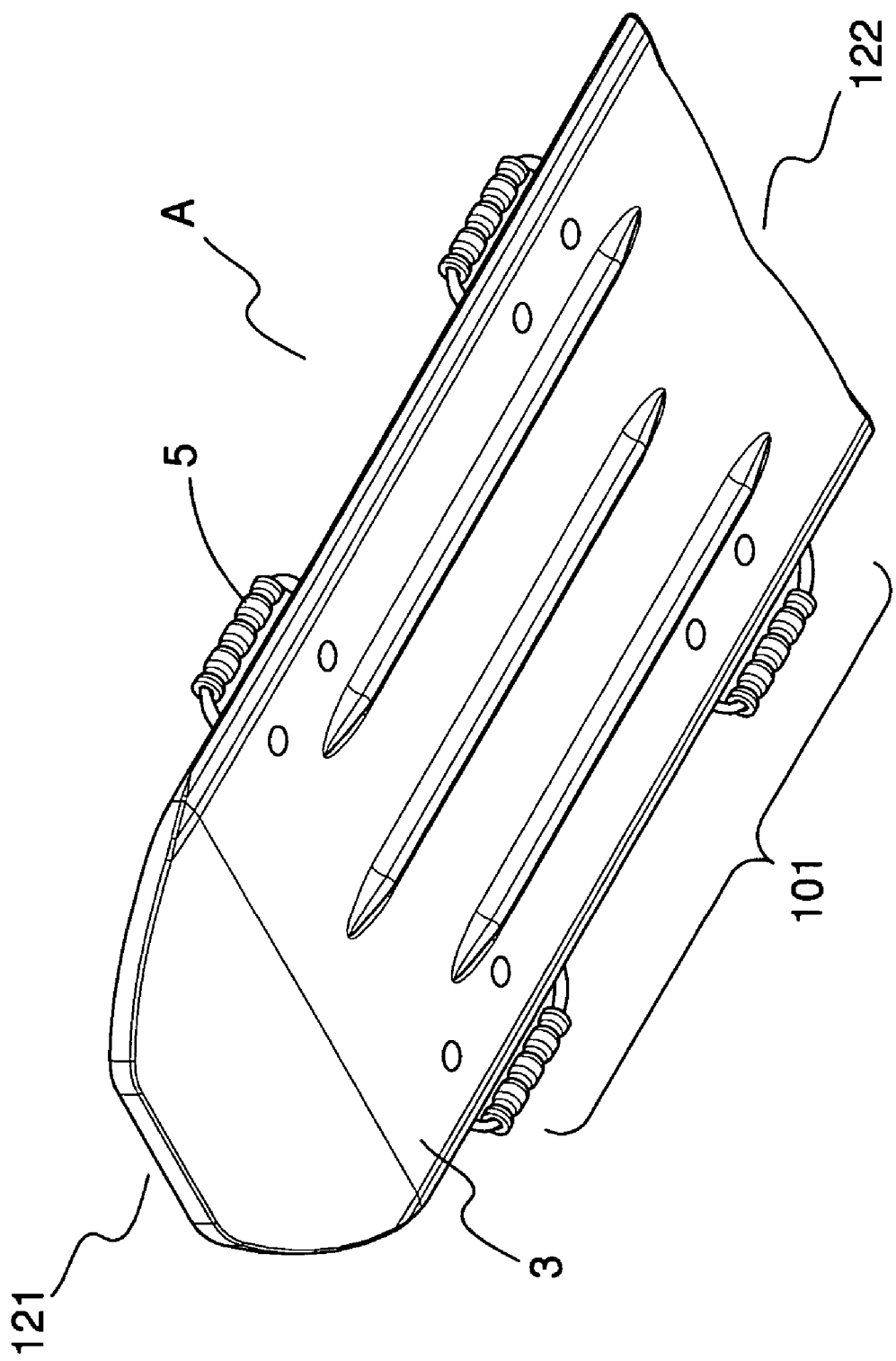
FIG. 2 is bottom perspective view of the slider as shown in FIG. 1.
Figure 3:
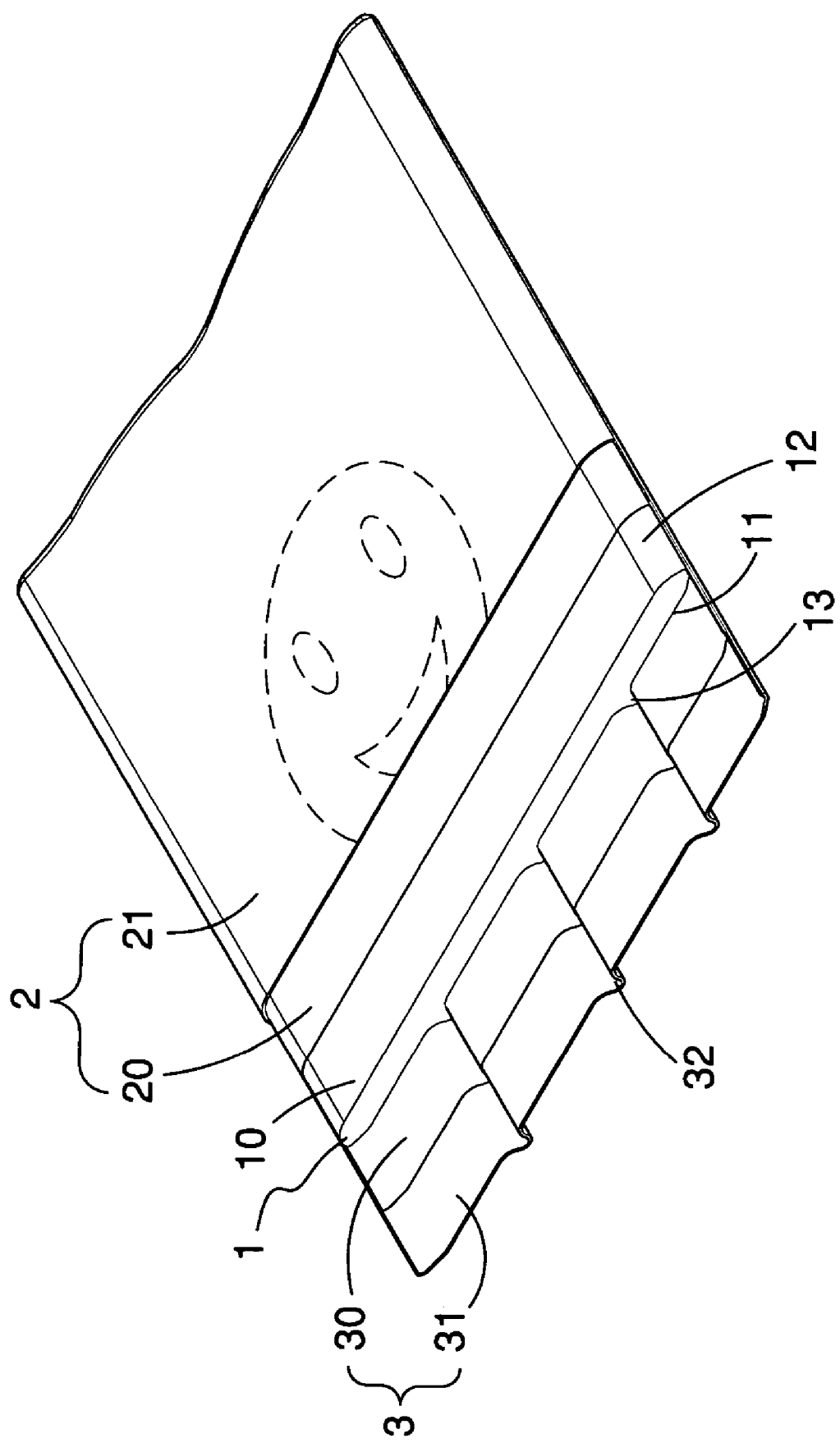
FIG. 3 is a partially cut-away perspective view of the slider as shown in FIG. 1.
Figure 4:
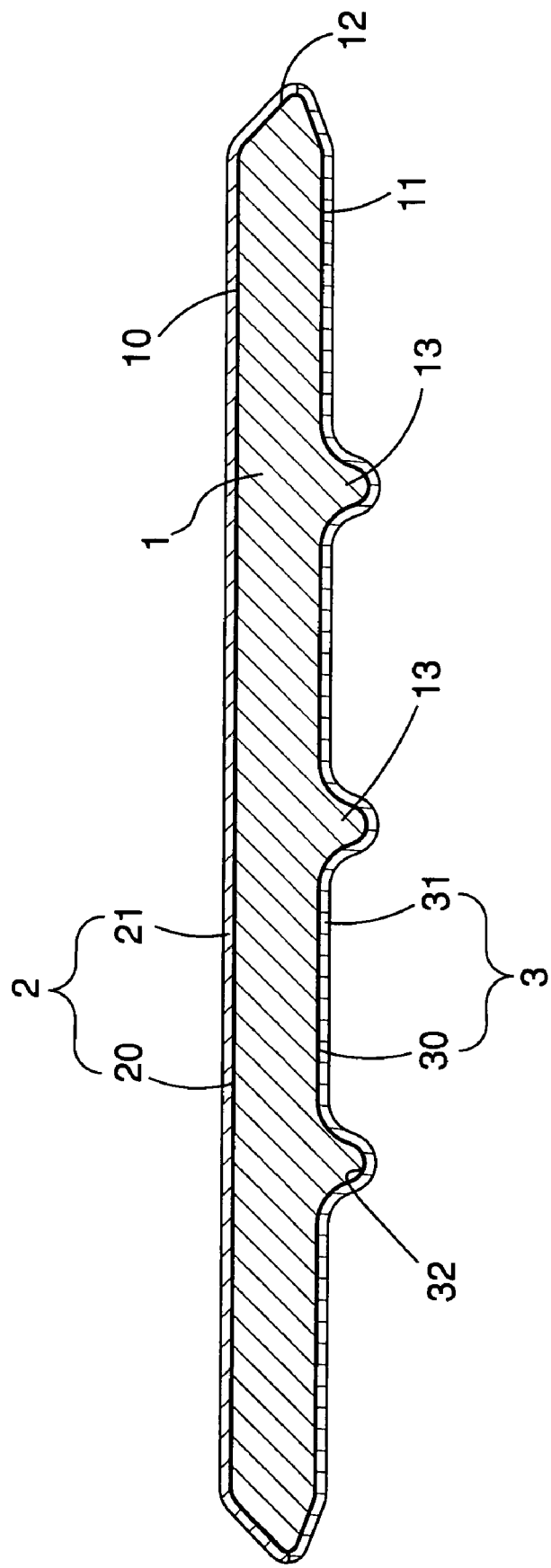
FIG. 4 is a plan cross-sectional view of the slider as shown in FIG. 3.

Referring to the drawings and initially to FIGS. 1-4, a slider "A" in accordance with a first embodiment of the present invention comprises a foam board 1, a top layer 2, and a bottom layer 3.

The foam board 1 of the slider "A" is made of a foam material, preferable made of polystyrene (PS) foam material and is formed to a predetermined shape by molds. The foam board 1 has a top face 10, a bottom face 11 located opposite to the top face 10, and edges 12 located between the top face 10 and the bottom face 11. The top face 10 of the foam board 1 has a riding portion 100 and the bottom face 11 of the foam board 1 has a rail portion 101 opposite to the riding portion 100. Furthermore, the bottom face 11 of the foam board 1 has a front end 121 and a rear end 122 located opposite to the front end 121. In addition, the rail portion 101 of the bottom face 11 of the foam board 1 has a plurality of foam rails 13 internally protruded therefrom and the foam rails 13 are parallel with each other. Therefore, the foam rails 13 of the slider "A" are provided for guiding a sliding direction to a user.

The top layer 2 of the slider "A" comprises an interface coating 20 and a laminated film 21. The interface coating 20 of the top layer 2 has a bottom face heat bonded to the top face 10 and the edges 12 of the foam board 1. The laminated film 21 of the top layer 2 has a bottom face heat bonded to a top face of the interface coating 20 of the top layer 2 completely. Preferably, the laminated film 21 of the top layer 2 is a patterned/colored polyethylene film.

The bottom layer 3 of the slider "A" comprises an interface coating 30 and a plastic plate 31. The interface coating 30 of the bottom layer 3 has a top face heat bonded to the bottom face 11 of the foam board 1. The plastic plate 31 of the bottom layer 3 is heat bonded to a bottom face of the interface coating 30 of the bottom layer 3 completely, whereby the bottom face 11 of the foam board 1 and the foam rails 13 of the rail portion 101 of the bottom face 11 of the foam board 1 are covered by the bottom layer 3 accordingly. Preferably, the plastic plate 31 of the bottom layer 3 is a wearable patterned/colored polyethylene plate.

Because the foam rails 13 of the rail portion 101 of the bottom face 11 of the foam board 1 are covered by the bottom layer 3, the bottom layer 3 is correspondingly formed a plurality of recessed joints 32. Furthermore, it is known that polystyrene materials are incompatible with polyethylene materials; therefore, the top layer 2 and the bottom layer 3 made of polyethylene materials are difficult to heat bond to the polystyrene foam board 1 of the slider "A". In the present invention, because the interface coatings 20, 30 of the top layer 2 and the bottom layer 3 have characteristics provided for thermal fusing the polystyrene materials and the polyethylene materials, the top layer 2 and the bottom layer 3 can be heat bonded to the polystyrene foam board 1 without adhesives by the interface coatings 20, 30.

In addition, a plurality of handgrips 5 are mounted on and located at two opposite sides of the slider "A" to facilitate a user holding the slider "A".

Figure 5:
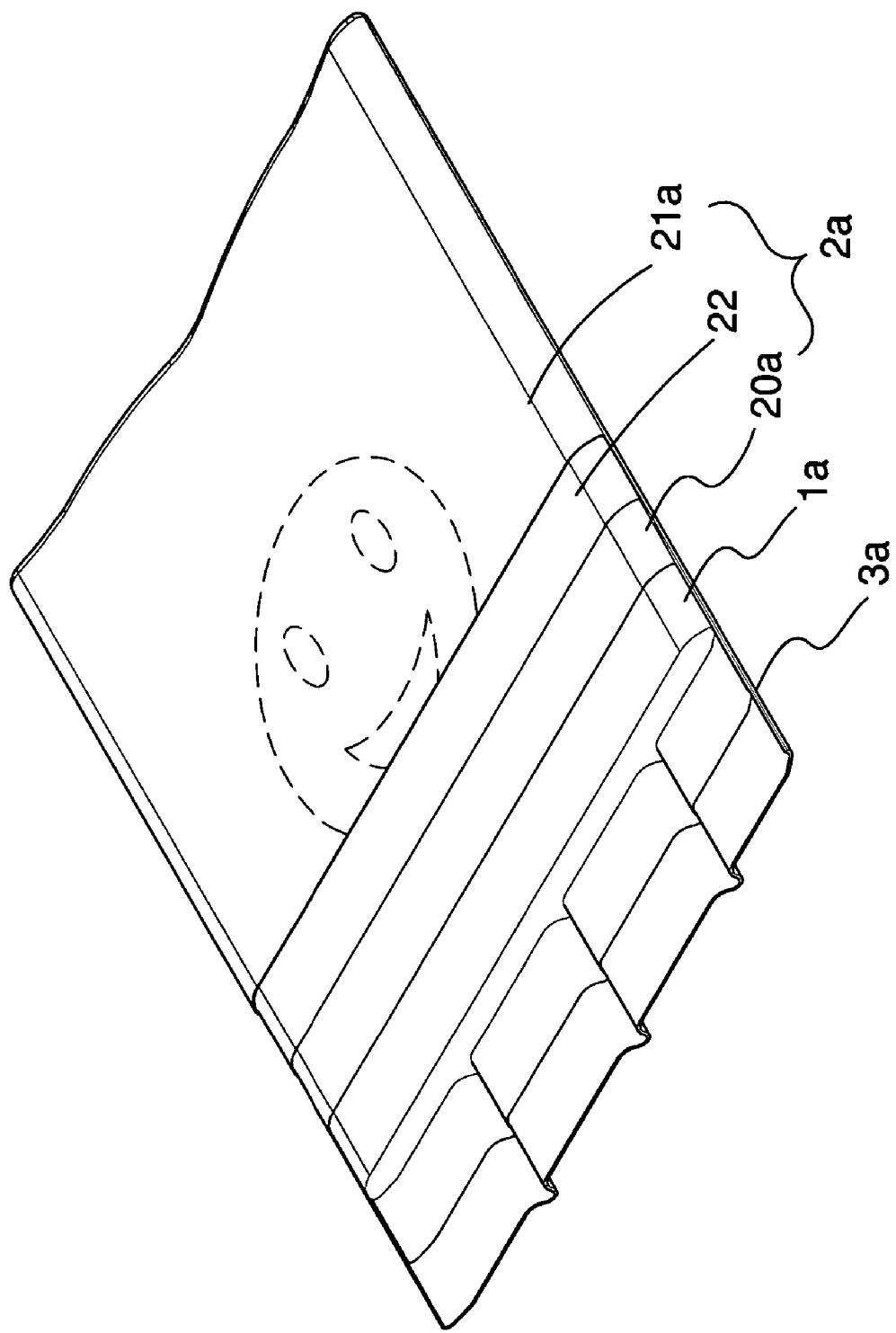
FIG. 5 is a partially cut-away perspective view of a slider in accordance with a second embodiment of the present invention.
Figure 6:
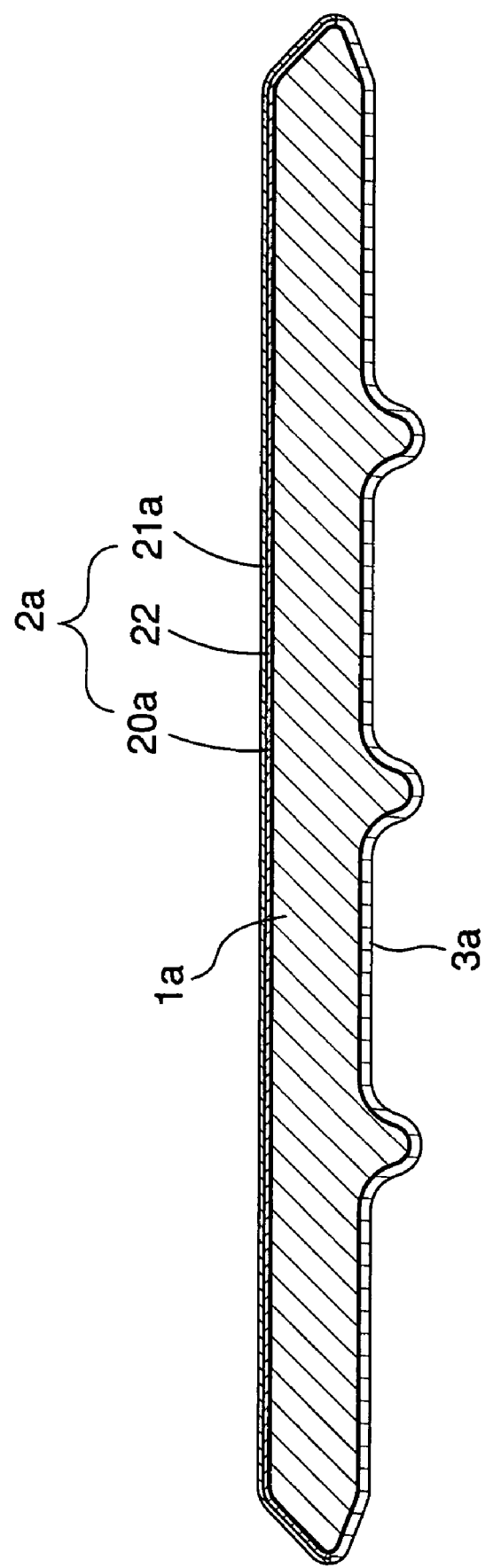
FIG. 6 is a plan cross-sectional view of the slider as shown in FIG. 5.

FIGS. 5 and 6 show a second embodiment of the present invention that comprises a foam board 1a, a top layer 2a and a bottom layer 3a. Similarly to the first embodiment, the foam board 1a of the second embodiment is a polystyrene foam board, the same as the foam board 1 of the first embodiment and the bottom layer 3a of the second embodiment is the same as the bottom layer 3 of the first embodiment. Therefore, detailed descriptions of the foam board 1a and the bottom layer 3a of the second embodiment are omitted.

Differently to the first embodiment, the top layer 2a of the second embodiment comprises an interface coating 20a, a polyethylene foam skin 22 and a laminated film 21a. The interface coating 20a of the top layer 2a has a bottom face heat bonded to the top face and the edges of the foam board 1a. The polyethylene foam skin 22 of the top layer 2a has a bottom face heat bonded to atop face of the interface coating 20a of the top layer 2a completely. In addition, the laminated film 21a of the top layer 2a is heat bonded to a top face of the polyethylene foam skin 22 of the top layer 2a completely.

Preferably, the polyethylene foam skin 22 of the top layer 2a has a density ranged from 1.5 PCF to 10 PCF and the laminated film 21a of the top layer 2a is a patterned/colored polyethylene film.

Figure 7:
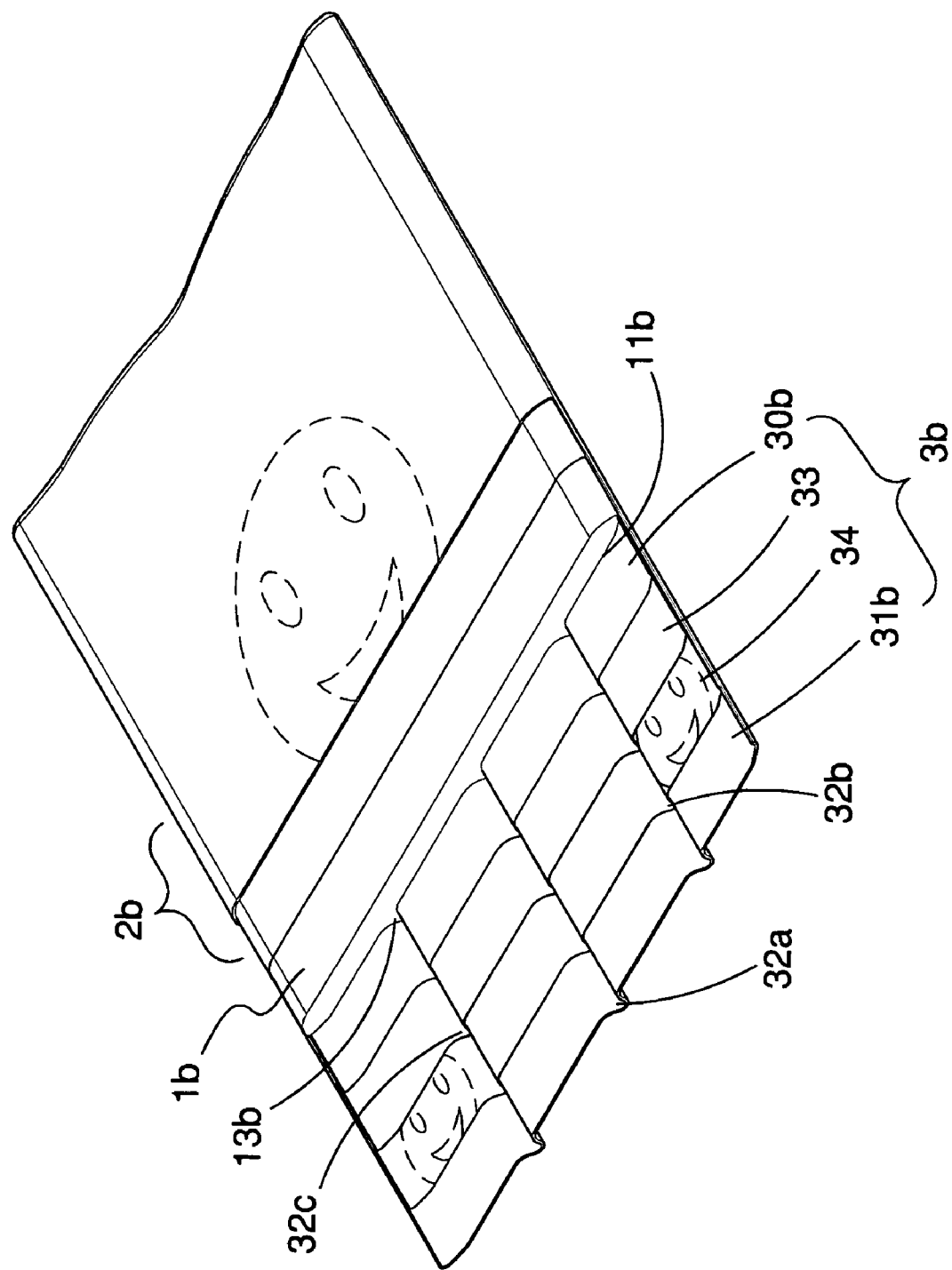
FIG. 7 is a partially cut-away perspective view of a slider in accordance with a third embodiment of the present invention.
Figure 8:
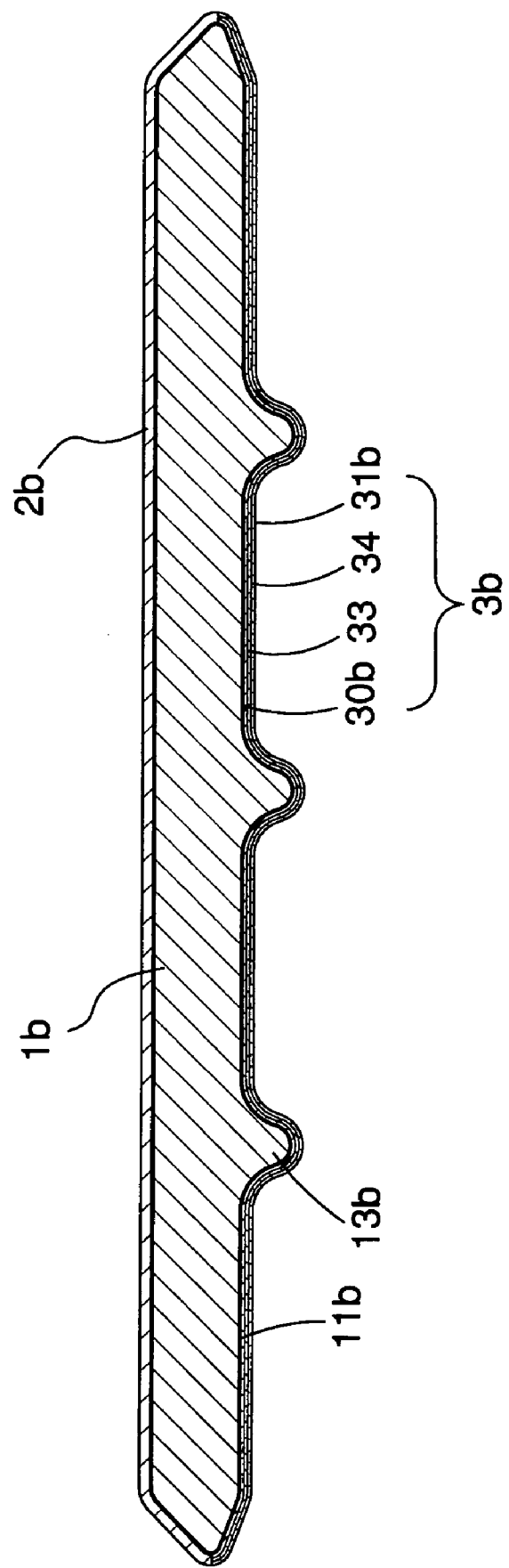
FIG. 8 is a plan cross-sectional view of the slider as shown in FIG. 7.

FIGS. 7 and 8 show a third embodiment of the present invention. The third embodiment comprises a foam board 1b, a top layer 2b and a bottom layer 3b. Similarly to the first embodiment, the foam board 1b of the third embodiment is a polystyrene foam board, the same as the foam board 1 of the first embodiment and the top layer 2b of the third embodiment is the same as the top layer 2 of the first embodiment. Therefore, detailed descriptions of the foam board 1b and the top layer 2b of the third embodiment are omitted.

Differently to the first embodiment, the bottom layer 3b of the third embodiment comprises an interface coating 30b, a polyethylene foam skin 33, a laminated film 34 and a plastic plate 31b. The interface coating 30b of the bottom layer 3b has a top face heat bonded to the bottom face of the foam board 1b. The polyethylene foam skin 33 has a top face heat bonded to a bottom face of the interface coating 30b of the bottom layer 3b completely. The laminated film 34 has a top face heat bonded to a bottom face of the polyethylene foam skin 33 of the bottom layer 3b completely. Furthermore, the plastic plate 31b is heat bonded to a bottom face of the laminated film 34 of the bottom layer 3b, so that the bottom face 11b of the foam board 1b and the foam rails 13b of the rail portion of the bottom face of the foam board 1b are covered by the bottom layer 3b.

Preferably, the polyethylene foam skin 33 of the bottom layer 3b has a density ranged from 1.5 PCF to 10 PCF, the laminated film 34 of the bottom layer 3b is a patterned/colored polyethylene film, and the plastic plate 31b of the bottom layer 3b is a wearable plate. In addition, because the foam rails 13b of the rail portion of the bottom face of the foam board 1b are covered by the bottom layer 3b, the polyethylene foam skin 33, the laminated film 34 and the plastic plate 31b the bottom layer 3b are correspondingly formed a plurality of recessed joints 32a, 32b, 32c.

Figure 9:
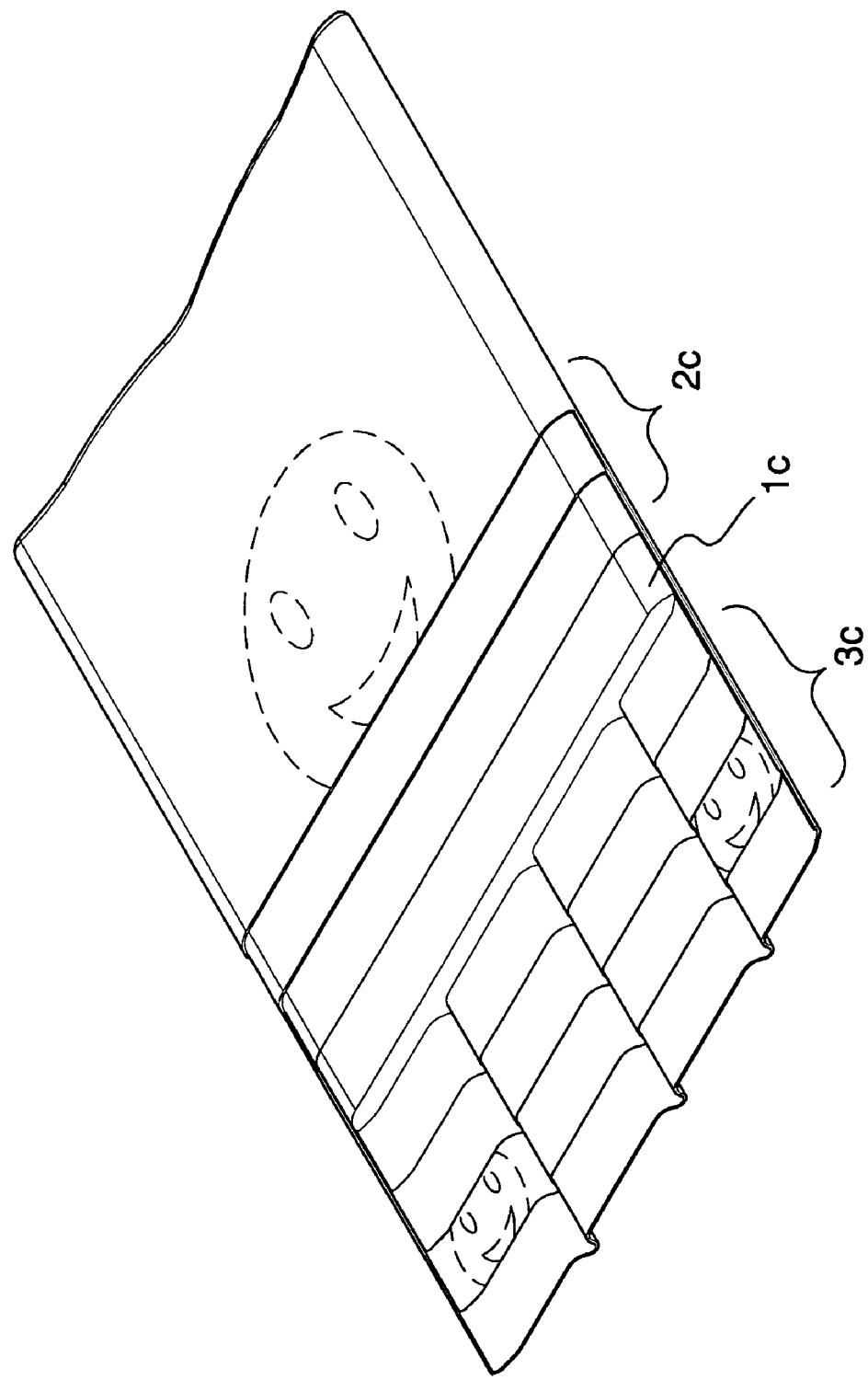
FIG. 9 is a partially cut-away perspective view of a slider in accordance with a fourth embodiment of the present invention.

FIG. 9 shows a fourth embodiment of the present invention. The fourth embodiment includes a foam board 1c, a top layer 2c and a bottom layer 3c. The foam board 1c of the fourth embodiment is the same as the foam board 1 of the first embodiment. Furthermore, the top layer 2c of the fourth embodiment is the same as the top layer 2a of the second embodiment and the bottom layer 3c is the same as the bottom layer 3b of the third embodiment. Therefore, the fourth embodiment of the present invention is basically a combined application of the second and third embodiments.

Figure 10:
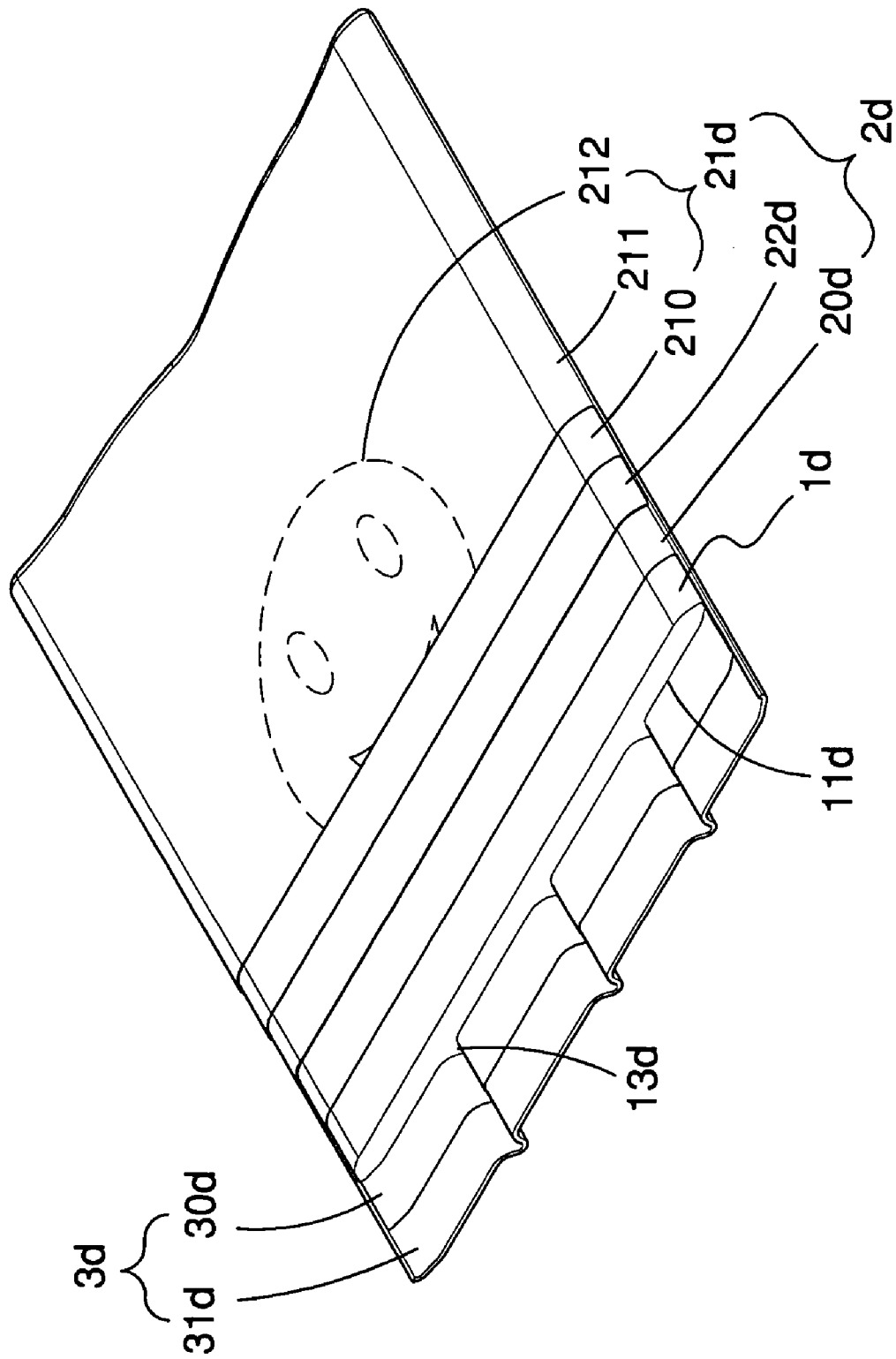
FIG. 10 is a partially cut-away perspective view of a slider in accordance with a fifth embodiment of the present invention.
Figure 11:
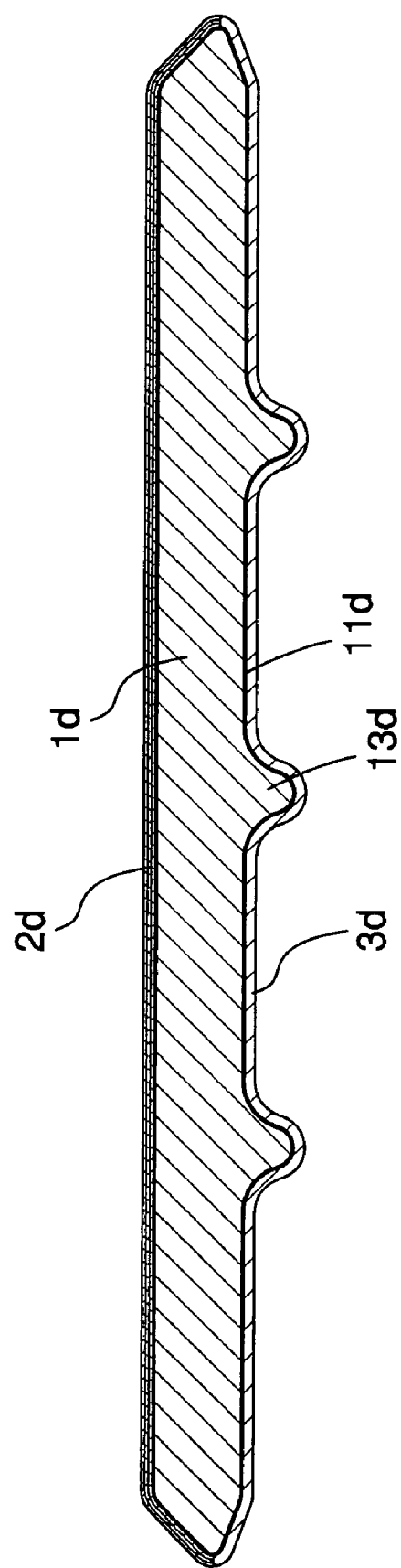
FIG. 11 is a plan cross-sectional view of the slider as shown in FIG. 10.

FIGS. 10-11 show a fifth embodiment of the present invention. The fifth embodiment comprises a foam board 1d, a top layer 2d and a bottom layer 3d. Similarly to the foregoing embodiments, the foam board 1d is a polystyrene foam board and has a plurality of foam rails 13d internally protruded from a rail portion of a bottom face 11d of the foam board 1d.

Similarly to the second embodiment, the top layer 2d, the top layer 2a of the fifth embodiment comprises an interface coating 20d, a polyethylene foam skin 22d and a laminated film 21d. Furthermore, compared to the second embodiment, the laminated film 21d of the top layer 2d in the fifth embodiment comprises an inner film 210, an outer film 211, and a pattern 212. The inner film 210 of the laminated film 21d has a top face and a bottom face provided for heat bonding to the top face of the polyethylene foam skin 22d completely. The outer film 211 of the laminated film 21d has a bottom face provided for forming the pattern 212 thereon and heat bonding to the top face of the inner film 210 of the laminated film 21d. As a result, the pattern 212 of the laminated film 21d is formed between the inner film 210 and the outer film 211, and the pattern 212 is visible from outside of top layer 2d. Preferably, the outer film 211 of the laminated film 21d has a thickness greater than a thickness of the inner film 210 of the laminated film 21d, such as a thickness from 0.02 mm to 0.15 mm for the outer film 211 and a thickness from 0.01 mm to 0.15 mm for the inner film 210.

Similarly to the first embodiment, the bottom layer 3d of the fifth embodiment comprises an interface coating 30d and a plastic plate 31d. The interface coating 30d of the bottom layer 3d has a top face heat bonded to the bottom face 11d of the foam board 1d. The plastic plate 31d of the bottom layer 3d is heat bonded to a bottom face of the interface coating 30d of the bottom layer 3d completely so that the bottom face 11d of the foam board 1d and the foam rails 13d of the rail portion of the bottom face 11d of the foam board 1d are covered by the bottom layer 3d accordingly.

Figure 12:
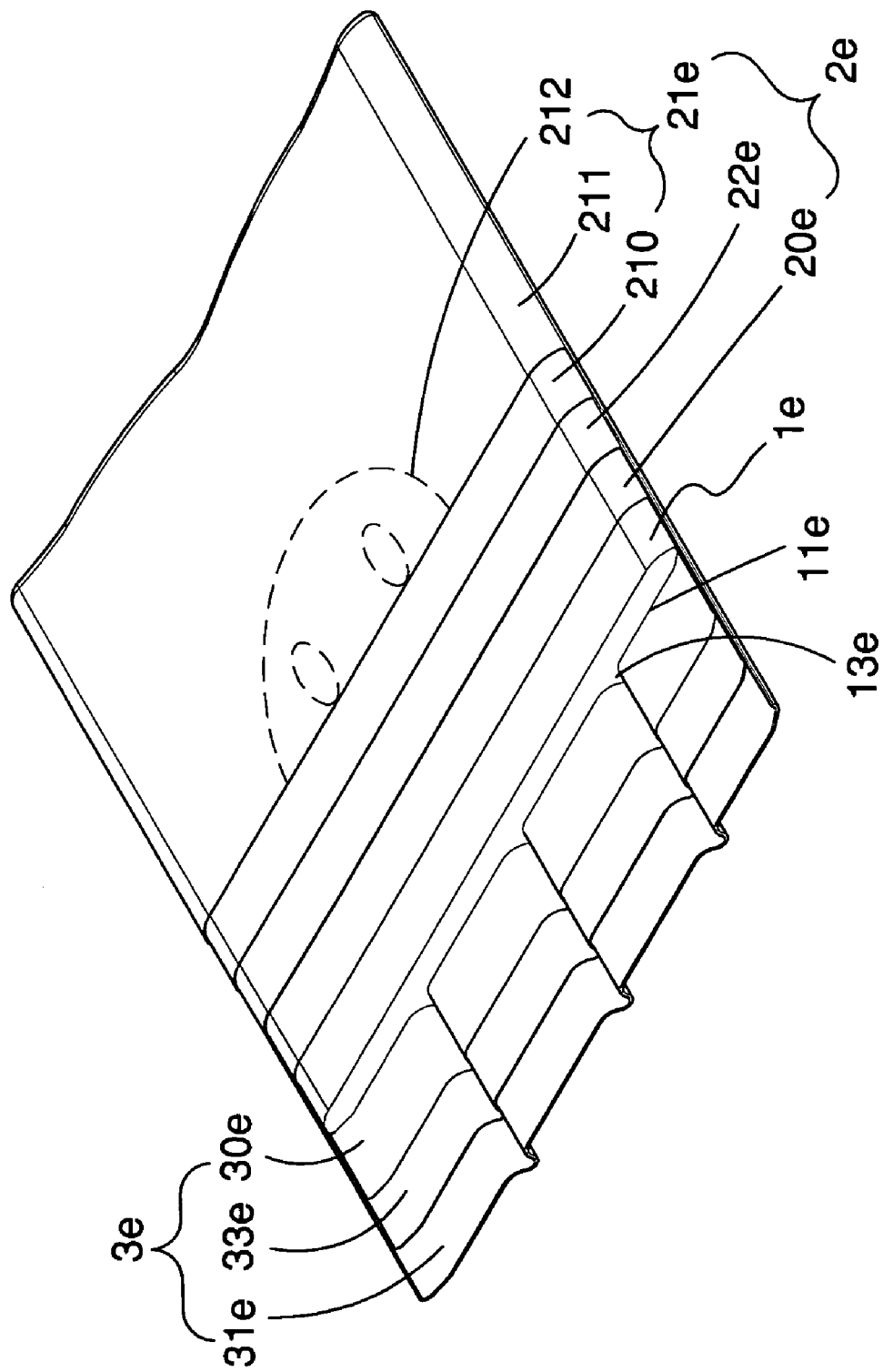
FIG. 12 is a partially cut-away perspective view of a slider in accordance with a sixth embodiment of the present invention.
Figure 13:
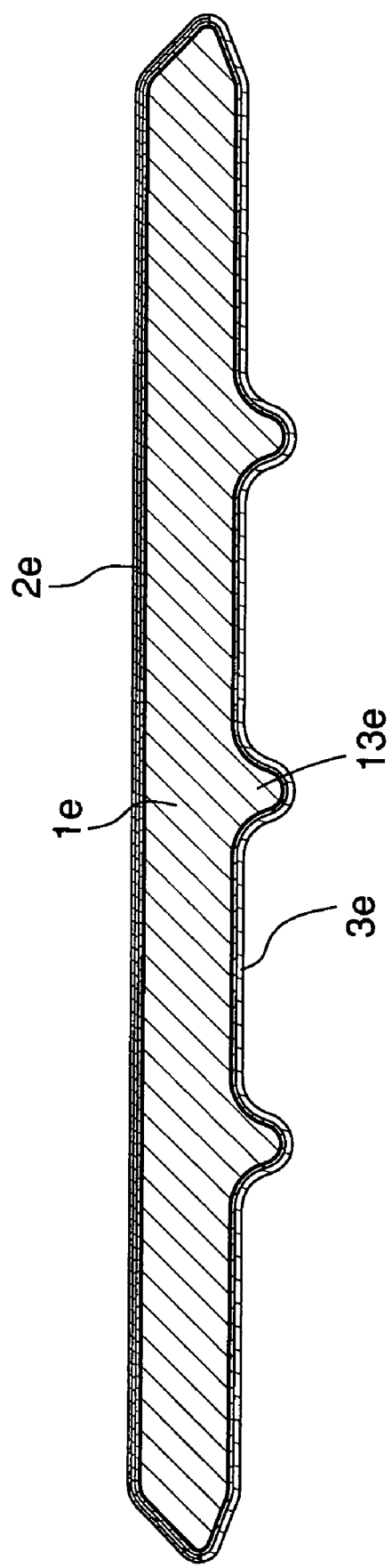
FIG. 13 is a plan cross-sectional view of the slider as shown in FIG. 12.

FIGS. 12-13 show a sixth embodiment of the present invention. The sixth embodiment comprises a foam board 1e, a top layer 2e and a bottom layer 3e. Similarly to the foregoing embodiments, the foam board 1e is a polystyrene foam board and has a plurality of foam rails 13e internally protruded from a rail portion of a bottom face 11e of the foam board 1e. In addition, the top layer 2e of the sixth embodiment is the same as the top layer 2d of the fifth embodiment and comprises an interface coating 20e, a polyethylene foam skin 22e and a laminated film 21e. The laminated film 21e of the top layer 2e also comprises an inner film 210, an outer film 211, and a pattern 212.

In the sixth embodiment, the bottom layer 3e comprises an interface coating 30e, a polyethylene foam skin 33e and a plastic plate 31e. The interface coating 30e of the bottom layer 3e has a top face heat bonded to the bottom face 11e of the foam board 1e. The polyethylene foam skin 33e has a top face heat bonded to a bottom face of the interface coating 30e of the bottom layer 3e completely. Furthermore, the plastic plate 31e is heat bonded to a bottom face of the polyethylene foam skin 33e of the bottom layer 3e completely, so that the bottom face 11e of the foam board 1e and the foam rails 13e of the rail portion of the bottom face 11e of the foam board 1e are covered by the bottom layer 3e.

Preferably, the polyethylene foam skin 33e of the bottom layer 3e has a density ranged from 1.5 PCF to 10 PCF and the plastic plate 31e of the bottom layer 3e is a wearable plate.

Figure 14:
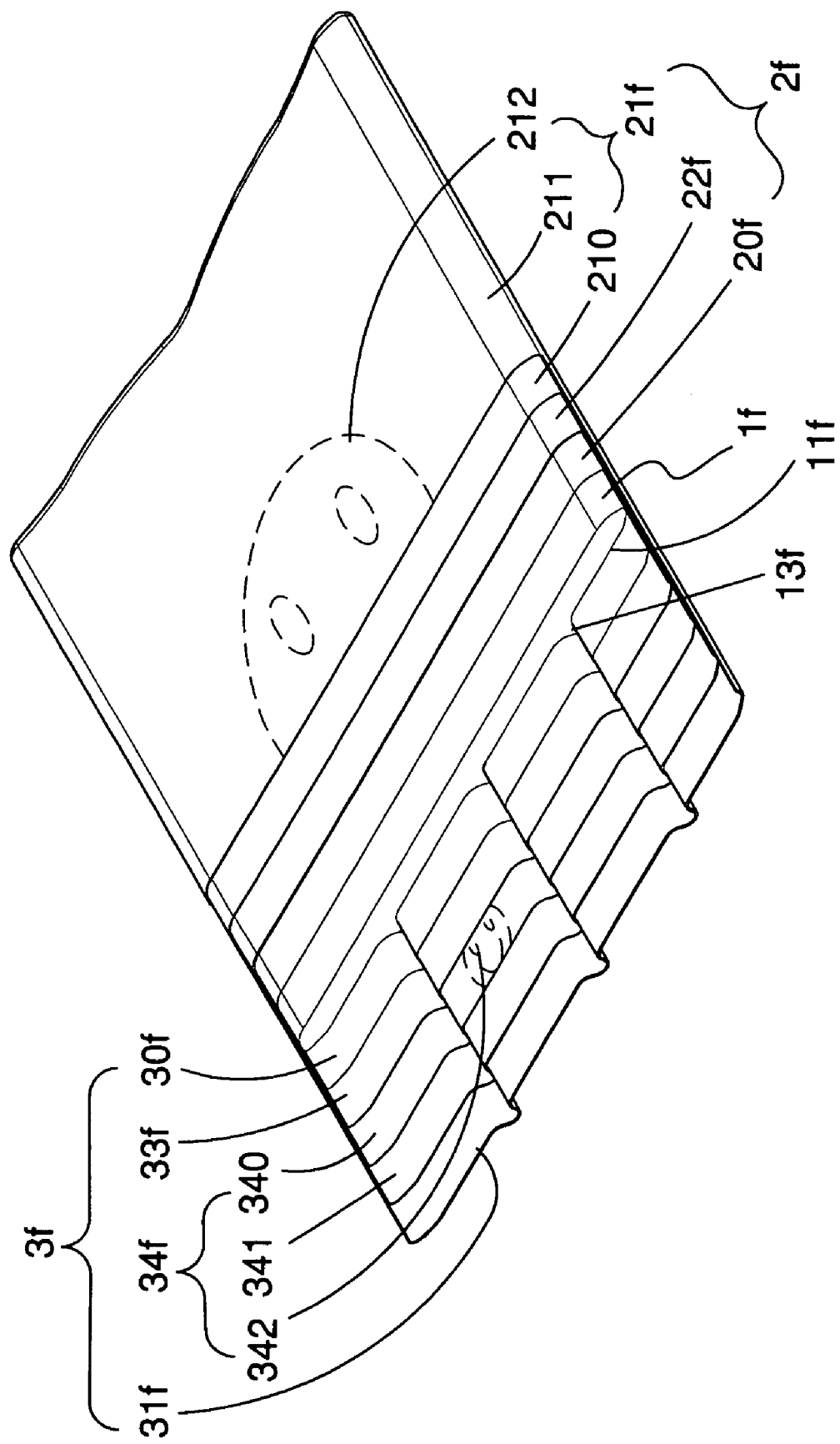
FIG. 14 is a partially cut-away perspective view of a slider in accordance with a seventh embodiment of the present invention.
Figure 15:
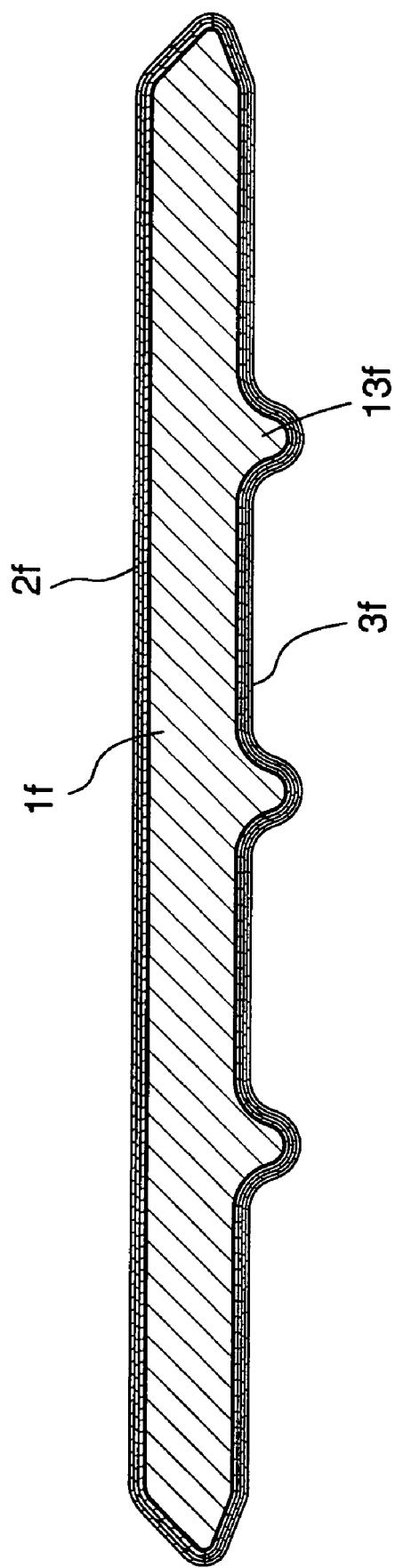
FIG. 15 is a plan cross-sectional view of the slider as shown in FIG. 14.

FIGS. 14-15 show a seventh embodiment of the present invention. The seventh embodiment comprises a foam board 1f, a top layer 2f and a bottom layer 3f. Similarly to the foregoing embodiments, the foam board 1f is a polystyrene foam board and has a plurality of foam rails 13f internally protruded from a rail portion of a bottom face 11f of the foam board 1f. In addition, the top layer 2f of the seventh embodiment is the same as the top layer 2d of the fifth embodiment and comprises an interface coating 20f, a polyethylene foam skin 22f and a laminated film 21f. The laminated film 21f of the top layer 2f also comprises an inner film 210, an outer film 211, and a pattern 212.

In the seventh embodiment, the bottom layer 3f comprises an interface coating 30f, a polyethylene foam skin 33f, a laminated film 34f, and a plastic plate 31f. The interface coating 30f of the bottom layer 3f has a top face heat bonded to the bottom face 11f of the foam board 1f. The polyethylene foam skin 33f has a top face heat bonded to a bottom face of the interface coating 30f of the bottom layer 3f completely. The laminated film 34f of the bottom layer 3f has a top face heat bonded to a bottom face of the polyethylene foam skin 33f of the bottom layer 3f and the plastic plate 31f is heat bonded to a bottom face of the laminated film 34f of the bottom layer 3f completely, so that the bottom face 11f of the foam board 1f and the foam rails 13f of the rail portion of the bottom face 11f of the foam board 1f are covered by the bottom layer 3f.

Furthermore, the laminated film 34f of the bottom layer 3f comprises an inner film 340, an outer film 341, and a pattern 342. The inner film 340 of the laminated film 34f of the bottom layer 3f has a top face provided for heat bonding to the bottom face of the polyethylene foam skin 33f of the bottom layer 3f. The outer film 341 of the laminated film 34f of the bottom layer 3f has a top face provided for forming the pattern 342 of the laminated film 34f of the bottom layer 3f thereon and heat bonding to a bottom face of the inner film 340 of the laminated film 34f of the bottom layer 3f, and has a bottom face provided for heat bonding to the plastic plate 31f of the bottom layer 3f. Therefore, the pattern 342 of the laminated film 34f of the bottom layer 3f is formed between the inner film 340 and the outer film 341, and the pattern 342 of the laminated film 34f is visible from outside of the bottom layer 3f.

According to the foregoing embodiments of the present invention, the foam board made of the polystyrene foam material is easily to be formed and molded directly that saves the manufacturing time and the costs of fabrication. Furthermore, the interface coatings of the top layer and the bottom layer have characteristics for bonding the polyethylene materials to the polystyrene foam materials without adhesives; therefore, the top layer and the bottom layer could be heat bonded to the polystyrene foam board by the interface coatings.

In addition, the foam board of the present invention could be a single layer foam board or a multi-layered foam board. Also, the top layer could be a patterned laminate of films and foam skin with the interface coating, or a patterned single film or a foam skin with the interface coating. The bottom layer could be a patterned film and foam skin with the interface coating and the plastic plate or a patterned single film or foam skin with the interface coating and the plastic plate.

Therefore, the slider with the foam rails provides a direction locating effect when the foam rails are placed into snow, sand and the like, so that the slider is moved forward linearly and stably by guidance of the foam rails to prevent the slider from swerving, so as to facilitate the user in controlling the slider and to protect the user's safety. Further, the slider has patterns visible from outside, thereby enhancing the outer appearance of the slider.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

What is claimed is:

1. A slider, comprising:

a foam board, made of polystyrene foam material, having a top face, a bottom face and edges, the top face of the foam board having a riding portion and the bottom face of the foam board having a rail portion opposite to the riding portion, wherein the rail portion of the bottom face of the foam board has a plurality of foam rails internally protruded therefrom and the foam rails are parallel with each other;

a top layer comprising an interface coating having a bottom face heat bonded to the top face and the edges of the foam board, a polyethylene foam skin having a bottom face heat bonded to a top face of the interface coating of the top layer completely, and a laminated film heat bonded to a top face of the polyethylene foam skin of the top layer completely, wherein the laminated film of the top layer comprises an inner film, an outer film, and a pattern formed between the inner film and the outer film, the pattern being visible from outside of the top layer; and a bottom layer comprising an interface coating having a top face heat bonded to the bottom face of the foam board and a plastic plate heat bonded to a bottom face of the interface coating of the bottom layer completely, whereby the bottom face of the foam board and the foam rails of the rail portion of the bottom face of the foam board are covered by the bottom layer.

2. The slider of claim 1, wherein the outer film of the laminated film of the top layer has a thickness greater than a thickness of the inner film of the laminated film of the top layer.

3. The slider of claim 2, wherein the inner film of the laminated film of the top layer has a bottom face provided for heat bonding to the top face of the polyethylene foam skin of the top layer, and the outer film of the laminated film of the top layer has a bottom face provided for forming the pattern of the laminated film of the top layer thereon and heat bonding to a top face of the inner film of the laminated film of the top layer.

4. A slider, comprising:

a foam board, made of polystyrene foam material, having a top face, a bottom face and edges, the top face of the foam board having a riding portion and the bottom face of the foam board having a rail portion opposite to the riding portion, wherein the rail portion of the bottom face of the foam board has a plurality of foam rails internally protruded therefrom and the foam rails are parallel with each other;

a top layer comprising an interface coating having a bottom face heat bonded to the top face and the edges of the foam board, a polyethylene foam skin having a bottom face heat bonded to a top face of the interface coating of the top layer completely, and a laminated film heat bonded to a top face of the polyethylene foam skin of the top layer completely, wherein the laminated film of the top layer comprises an inner film, an outer film, and a pattern formed between the inner film and the outer film, the pattern being visible from outside of the top layer; and a bottom layer comprising an interface coating having a top face heat bonded to the bottom face of the foam board, a polyethylene foam skin having a top face heat bonded to a bottom face of the interface coating of the bottom layer completely, and a plastic plate heat bonded to a bottom face of the polyethylene foam skin of the bottom layer completely, whereby the bottom face of the foam board and the foam rails of the rail portion of the bottom face of the foam board are covered by the bottom layer.

5. The slider of claim 4, wherein the outer film of the laminated film of the top layer has a thickness greater than a thickness of the inner film of the laminated film of the top layer.

6. The slider of claim 5, wherein the inner film of the laminated film of the top layer has a bottom face provided for heat bonding to the top face of the polyethylene foam skin of the top layer, and the outer film of the laminated film of the top layer has a bottom face provided for forming the pattern of the laminated film of the top layer thereon and heat bonding to a top face of the inner film of the laminated film of the top layer.

7. A slider, comprising:

a foam board, made of polystyrene foam material, having a top face, a bottom face and edges, the top face of the foam board having a riding portion and the bottom face of the foam board having a rail portion opposite to the riding portion, wherein the rail portion of the bottom face of the foam board has a plurality of foam rails internally protruded therefrom and the foam rails are parallel with each other;

a top layer comprising an interface coating having a bottom face heat bonded to the top face and the edges of the foam board, a polyethylene foam skin having a bottom face heat bonded to a top face of the interface coating of the top layer completely, and a laminated film heat bonded to a top face of the polyethylene foam skin of the top layer completely, wherein the laminated film of the top layer comprises an inner film, an outer film, and a pattern formed between the inner film and the outer film, the pattern being visible from outside of the top layer; and a bottom layer comprising an interface coating having a top face heat bonded to the bottom face of the foam board, a polyethylene foam skin having a top face heat bonded to a bottom face of the interface coating of the bottom layer completely, a laminated film having a top face heat bonded to a bottom face of the polyethylene foam skin of the bottom layer completely, and a plastic plate heat bonded to a bottom face of the laminated film of the bottom layer completely, whereby the bottom face of the foam board and the foam rails of the rail portion of the bottom face of the foam board are covered by the bottom layer, wherein the laminated film of the bottom layer comprises an inner film, an outer film, and a pattern formed between the inner film and the outer film, the pattern being visible from outside of the bottom layer.

8. The slider of claim 7, wherein the outer film of the laminated film of the top layer has a thickness greater than a thickness of the inner film of the laminated film of the top layer.

9. The slider of claim 8, wherein the inner film of the laminated film of the top layer has a bottom face provided for heat bonding to the top face of the polyethylene foam skin of the top layer, and the outer film of the laminated film of the top layer has a bottom face provided for forming the pattern of the laminated film of the top layer thereon and heat bonding to a top face of the inner film of the laminated film of the top layer.

10. The slider of claim 9, wherein the inner film of the laminated film of the bottom layer has a top face provided for heat bonding to the bottom face of the polyethylene foam skin of the bottom layer, and the outer film of the laminated film of the bottom layer has a top face provided for forming the pattern of the laminated film of the bottom layer thereon and heat bonding to a bottom face of the inner film of the laminated film of the bottom layer, and a bottom face provided for heat bonding to the plastic plate of the bottom layer.

* * * * *